March 12, 1957 — J. KREMSER — 2,784,710
POWER TAKE-OFF FOR WHEELED OR CRAWLER TRACTORS
Filed July 31, 1953

INVENTOR
JOHANN KREMSER
ATTORNEY.

United States Patent Office 2,784,710
Patented Mar. 12, 1957

2,784,710

POWER TAKE-OFF FOR WHEELED OR CRAWLER TRACTORS

Johann Kremser, Hannover, Germany

Application July 31, 1953, Serial No. 371,496

Claims priority, application Germany October 10, 1952

6 Claims. (Cl. 123—195)

The present invention relates to a power take-off drive, particularly suited for wheeled or crawler tractors, and which may also be employed in motor-vehicles of any type. In many cases power take-off drives have already been in use on wheeled and crawler tractors to drive certain auxiliary equipment or attachments, said power take-off drives being arranged behind the clutch and, respectively, behind the gear-box. This arrangement is undesirable inasmuch as the power take-off shaft drive is interrupted when the clutch is disengaged. Therefore, it has already been proposed to employ "live" power take-off shafts, i. e. power take-off shafts which work independently from the clutch. The drive for the power take-off shaft in such designs is taken from the crank shaft via a belt drive. The employment of a belt, however, is disadvantageous. Furthermore, the power take-off unit which in general was provided with its own clutch and with a reduction gearing, had to be specially journalled. It has also been proposed to drive live power take-off shafts from the crank shaft by providing an auxiliary gearing between the fly-wheel and the wall mounted oil-tight to the engine block. It was a disadvantage of this drive that it had to be specially provided and that it could not be lubricated so that gears made of some artificial product had to be used.

It is, therefore, one object of the present invention to provide a power take-off drive in which the deficiencies of the designs known so far are eliminated. It is another object of the present invention to provide a live power take-off drive which is independent from the clutch by taking the drive for the power take-off shaft from a timing gear or from a gear driving another auxiliary element. In this way drive members are utilized for the drive of the shaft which in any case are available on the engine. Preferably the gearing for the drive of the power take-off shaft is calculated so that the total engine output may be transmitted.

It is still another object of the present invention to utilize in blower-scavenged, two-stroke cycle engines, for instance, or in supercharged four-stroke cycle engines, the intermediate gear arranged between the crank shaft gear and the blower drive gear is utilized for the drive of the power take-off shaft. In standard-design four-stroke cycle engines the gear on the cam shaft or an intermediate gear arranged between said cam shaft gear and the crank shaft gear may be employed for the power take-off shaft drive. However, other gears available on the engine for the drive of auxiliary elements may be used for the power take-off drive.

It is also another object of the present invention to provide an arrangement of the power take-off drive in which it is possible to extend the power take-off shaft to the one or the other end or to both ends of the engine. On the other hand, the bracket for the power take-off drive may be laid out so that a starter motor may be fitted instead of the power-take-off drive, the pinion of said starter motor coming into contact with the teeth of the fly wheel. This is of particular advantage, when the engine is alternatively fitted to wheeled and crawler tractors, and to motor vehicles, and when it is employed stationary. In cases where a power take-off drive is required, as for instance in wheeled tractors, the starter motor may be fitted at the fly wheel front side, i. e. on the side opposite the engine. In motor vehicles or when the engine is used stationary, i. e. when the power take-off drive is not required and the arrangement of the starter motor as described above is inconvenient, the bearing brackets for the power take-off drive may be utilized for mounting the starter motor.

With these and other objects in view which will become apparent in the following detailed description, the present invention will be clearly understood in connection with the accompanying drawing, in which.

Figure 1:
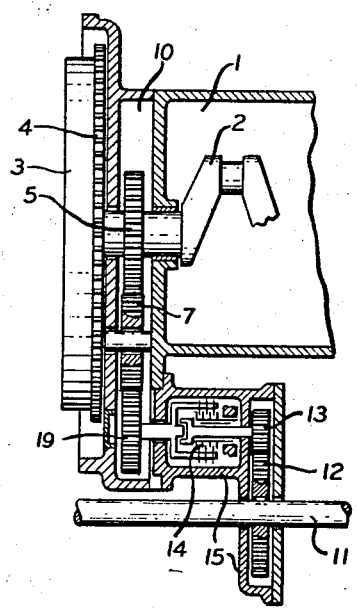
Fig. 1 is a fragmentary sectional view of the engine, to which a power take-off drive is fitted.
Figure 2:
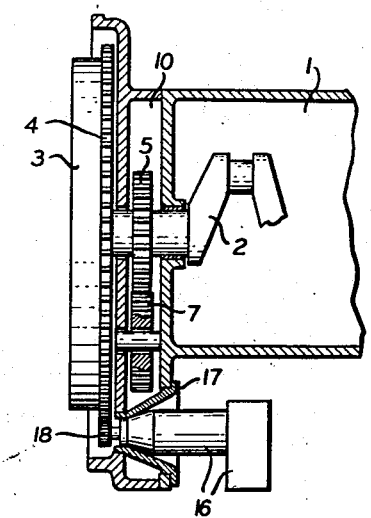
Fig. 2 is a fragmentary sectional view similar to that in Fig. 1, except that a starter motor is provided instead of the power take-off drive.
Figure 3:
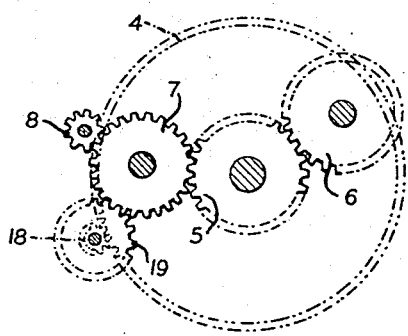
Figs. 3 and 4 show schematically the transmission arrangement for the power take-off shaft.

Referring now to the drawing, the crankshaft 2 is journalled in the engine housing 1 in the usual way, a fly wheel 3 with a ring gear 4 being mounted to said crankshaft which is provided with the gear 5 driving the auxiliary elements of the engine. In an arrangement according to Fig. 3 the gear 5, for instance, drives a gear 6 for the operation of the injection pump or, if necessary, the valves or the like. If a blower is fitted, the blower drive gear 8 may be driven by the gear 5 via an intermediate gear 7.

Figure 4:
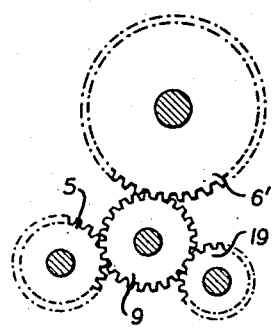

In the arrangement according to Fig. 4 an intermediate gear 9 is arranged between the gear 5 and the gear 6' which, for instance, is mounted on the cam shaft.

Preferably the gear transmissions as described above are enclosed by an oil-tight housing 10.

The power take-off drive unit substantially comprises the power take-off shaft 11 with a reduction gearing 12, 13, and a clutch 14, all of which are arranged in one housing 15. The housing 10 enclosing the transmission is provided with a bracket to which the power take-off drive unit 11—15 may be mounted. Said bracket may be laid out so that a starter motor 16 may be fitted instead of the power take-off unit, by employing an oil-tight intermediate member 17. The starter pinion 18 comes into contact with the ring gear 4 of the fly wheel 3.

The power take-off unit is designed in such manner that the power take-off drive gear 19 comes into mesh with one of the gears 7 or 9 when mounting the unit. At the same time is is possible to extend the power take-off shaft 11 to the one or the other end or to both ends of the engine.

While I have disclosed one embodiment of the present invention, it is to be understood that this embodiment is given by example only and not in a limiting sense, the scope of the present invention being determined by the objects and the claims.

I claim:

1. In a tractor including a driving engine having a crankshaft, an engine housing and accessories operated by said engine, a power take-off unit, a main gear mounted on said crankshaft and a gear train in operative connection with said main gear and adapted to operate said accessories, said power take-off unit including a power take-off shaft bearing a driven gear, the latter being in operative connection with one gear of said gear train, in order to drive said power take-off shaft directly by means of said gear train, the gears of said gear train leading to said driven gear and the latter are dimensioned to permit the transmission of the full output of said engine to said power take-off shaft, and clutch means disposed between said gear train and said driven gear for engagement and disengagement, respectively, of said take-off shaft from said gear train.

2. The tractor, as set forth in claim 1, which includes a closed auxiliary housing, bearings for said power take-off shaft mounted in said auxiliary housing, and the latter receiving simultaneously said coupling means.

3. The tractor, as set forth in claim 1, which includes a chamber receiving the gear train for operation of said accessories, and means for oil-tight connection of said auxiliary housing with said chamber.

4. The tractor, as set forth in claim 3, in which said auxiliary housing is removably connected with said chamber, and said auxiliary housing with said power take-off shaft being adapted to be replaced by a starter motor device for said engine.

5. The tractor, as set forth in claim 1, which includes a gear transmission and a coupling between said crankshaft and said gear transmission, said main gear transmitting power to said driven gear independently of the position of said coupling.

6. In a tractor including a driving engine having a crankshaft, an engine housing and accessories operated by said engine, a power take-off unit, a main gear and a fly wheel carrying a ring gear mounted on said crankshaft and a gear train in operative connection with said main gear and adapted to operate said accessories, said power take-off unit including a power take-off shaft bearing a driven gear, the latter being in operative connection with one gear of said gear train in order to drive said power take-off shaft directly by means of said gear train, clutch means disposed between said gear train and said driven gear for engagement and disengagement, respectively, of said take-off shaft from said gear train, said driven gear and said power take-off shaft being adapted to be replaced by a starter motor device for said engine including a starter pinion to be meshed with said ring gear.

References Cited in the file of this patent

UNITED STATES PATENTS

| | | |
|---|---|---|
| 1,887,355 | Kranick | Nov. 8, 1932 |
| 2,568,473 | Tucker | Sept. 18, 1951 |
| 2,618,979 | Benning | Nov. 25, 1952 |
| 2,660,989 | Schnurle, et al. | Dec. 1, 1953 |

FOREIGN PATENTS

| | | |
|---|---|---|
| 391,762 | France | Sept. 5, 1908 |
| 519,210 | Great Britain | Mar. 19, 1940 |